Aug. 3, 1937.  R. CRZELLITZER  2,088,948
VARIABLE SPEED DRIVE
Filed March 7, 1936   4 Sheets-Sheet 2
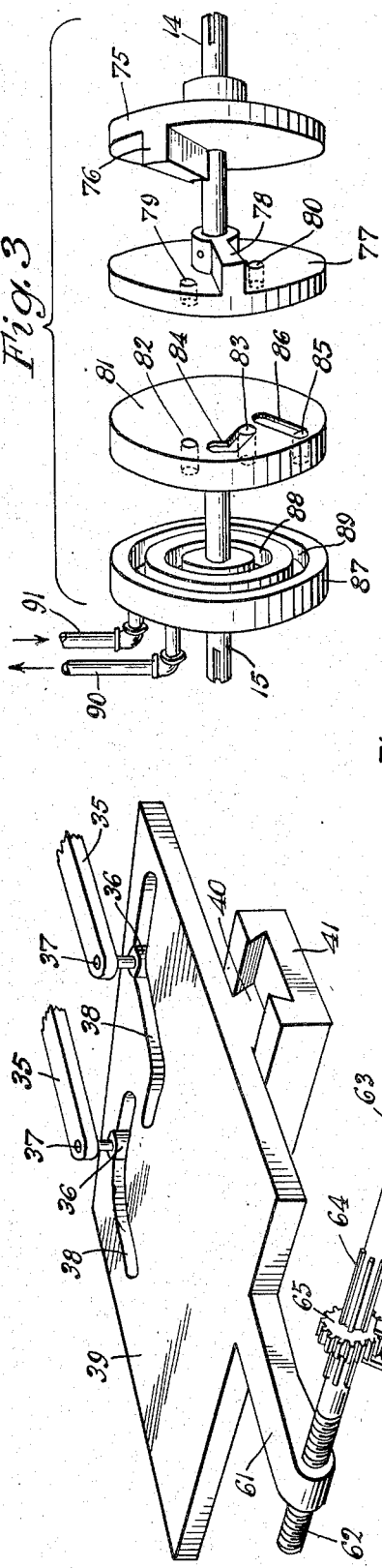
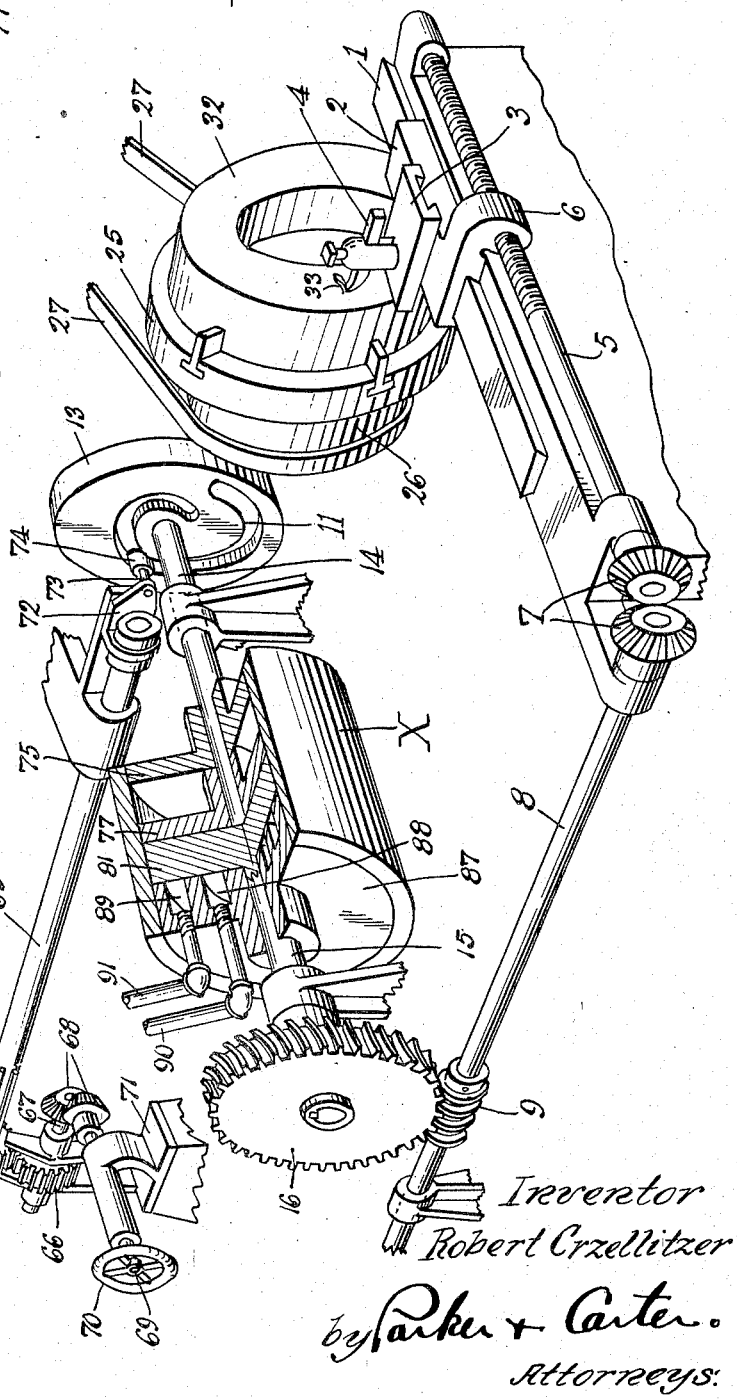
Inventor
Robert Crzellitzer
by Parker + Carter
Attorneys

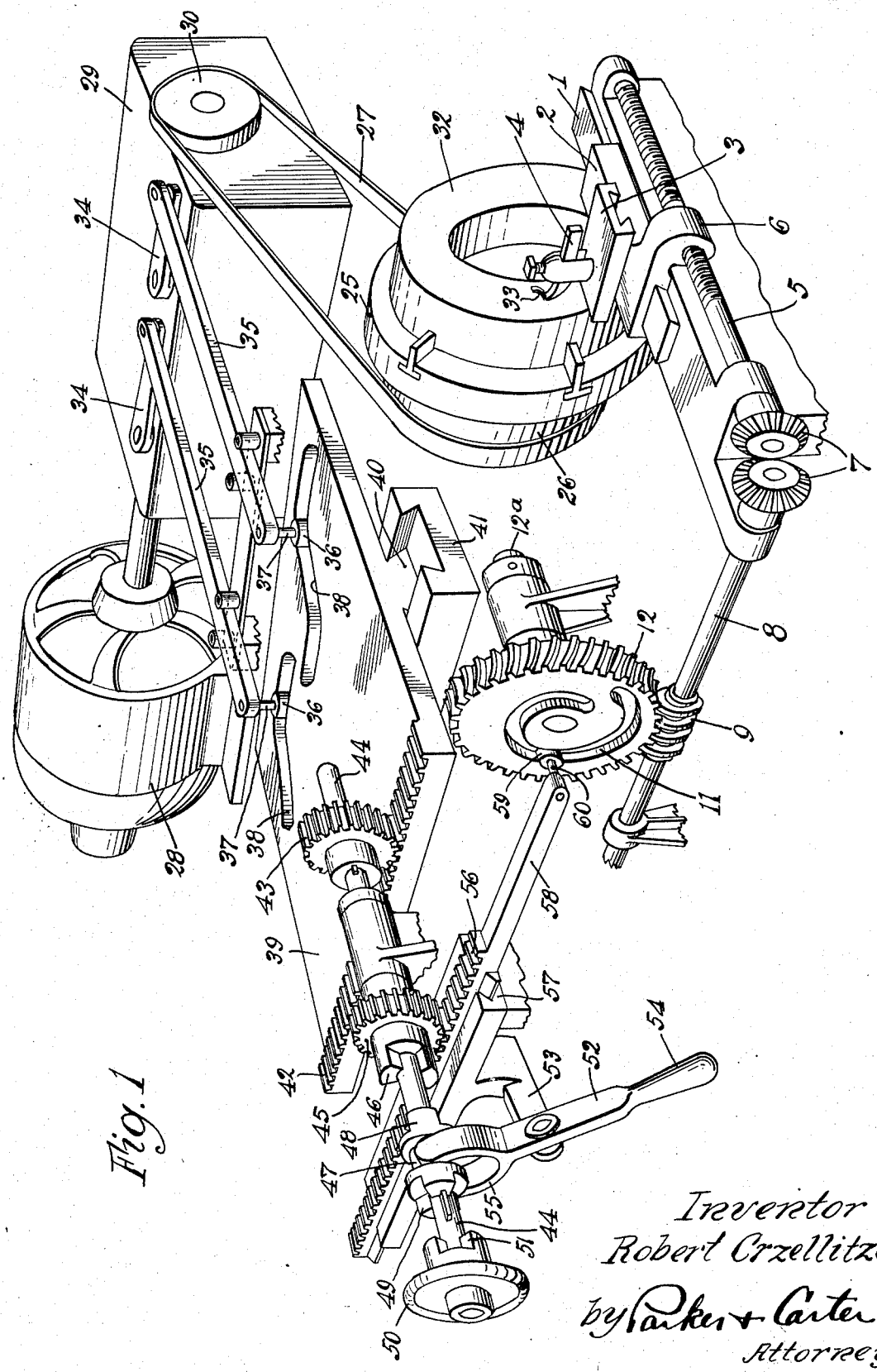

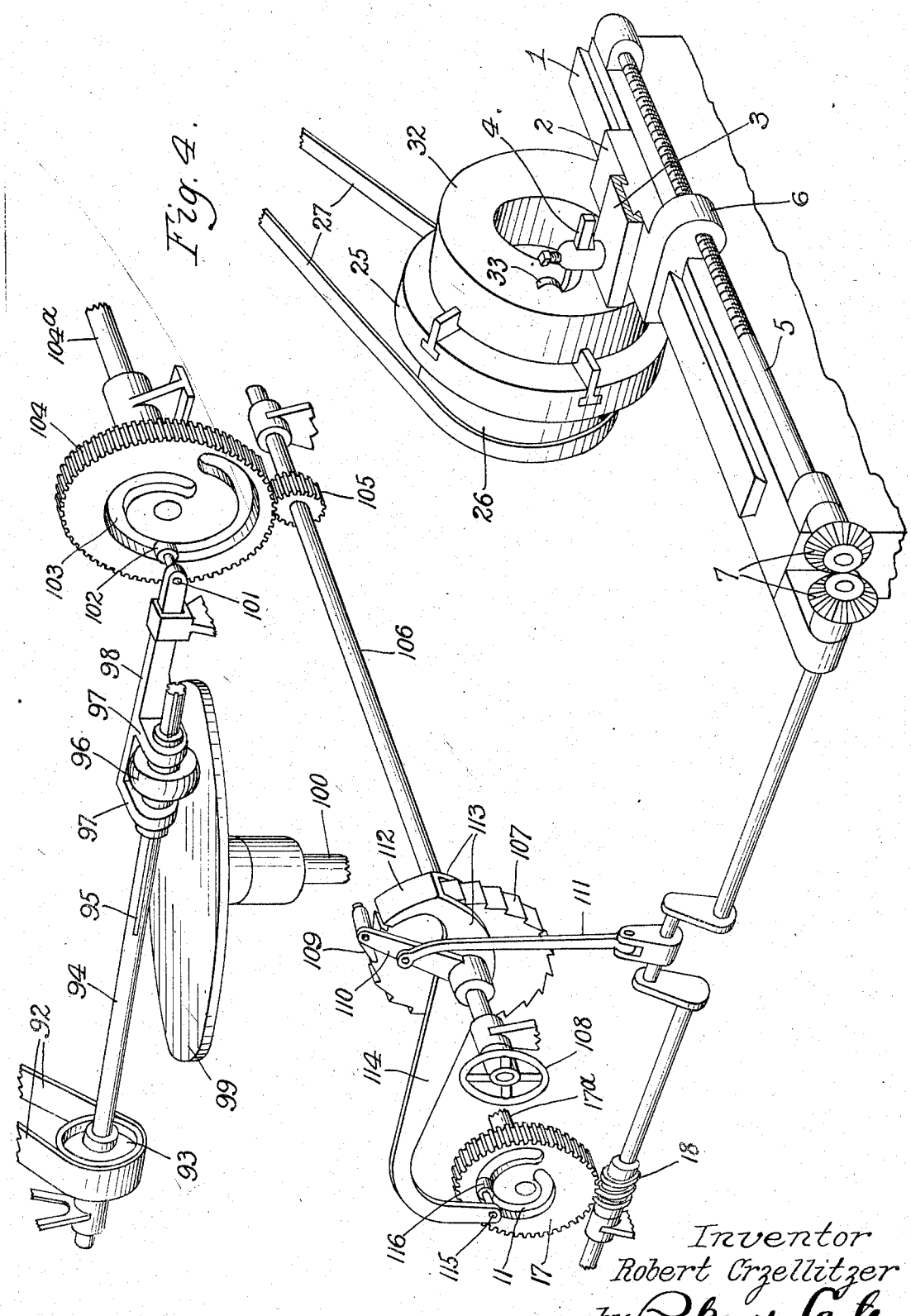

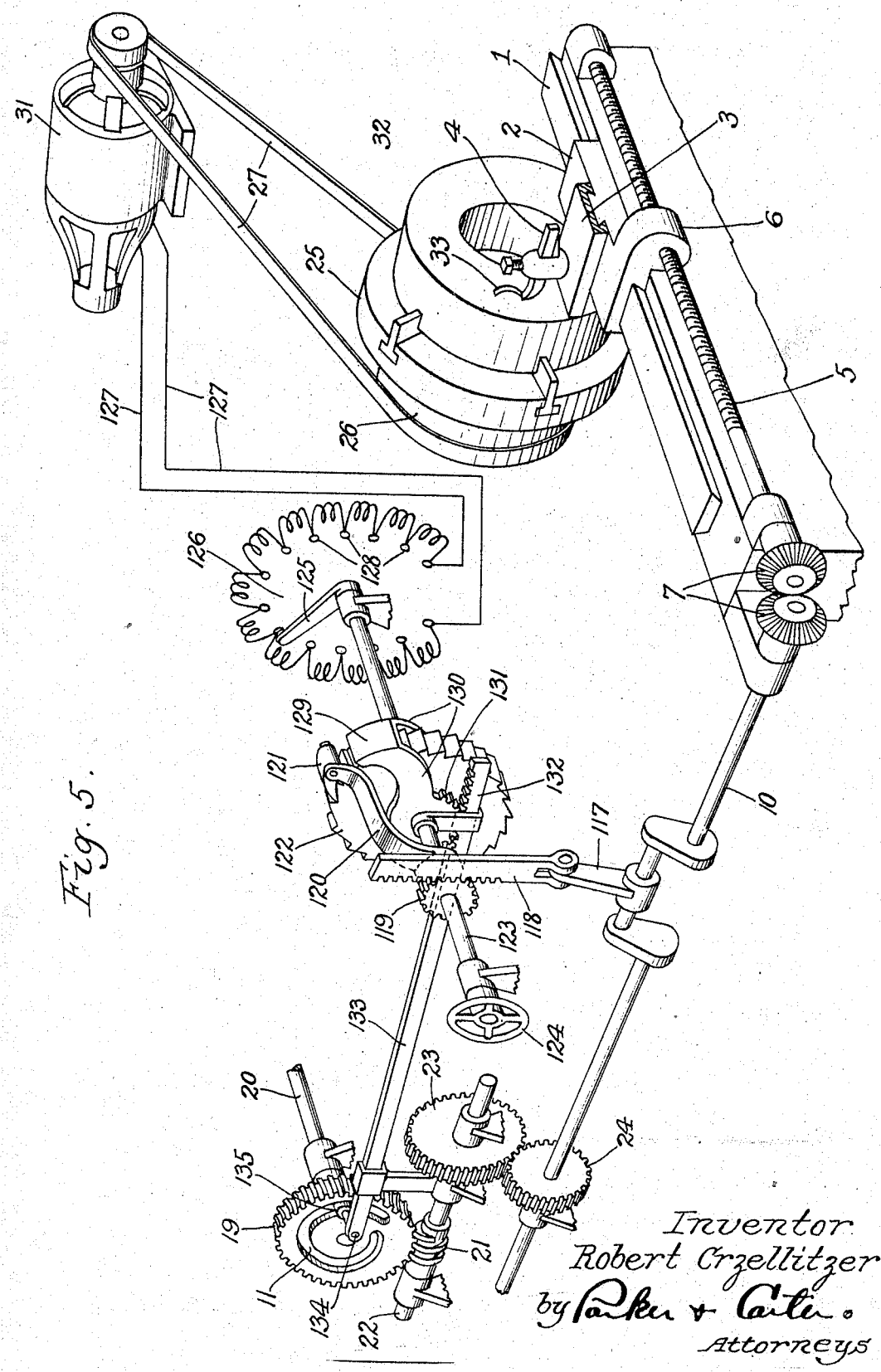

Patented Aug. 3, 1937

2,088,948

UNITED STATES PATENT OFFICE 2,088,948

VARIABLE SPEED DRIVE

Robert Crzellitzer, Ivrea, Italy, assignor to Link-Belt Company, Chicago, Ill., a corporation of Illinois Application March 7, 1936, Serial No. 67,637

16 Claims. (Cl. 82—21)

This invention relates to a variable speed control device and has for one object to provide a mechanism for use in connection with lathes and other machines for shaping, cutting, finishing, and otherwise treating pieces of work in which a constant or approximately constant cutting speed is provided and is automatically maintained throughout the cutting or shaping operation.

Another object is to provide a constant speed for an object or point which moves in a generally spiral path and in connection with which the actual rotational speed must be varied automatically to maintain constant the speed of the point or object moving along such spiral path.

One application of the invention is in connection with turning and boring lathes, facing lathes or trimming machines to maintain a constant cutting speed, irrespective of changes in the radius. For this purpose the rotational speed of the member carrying the work must be varied in proportion to the variations in the radial position of the cutting tool with respect to the work, and it is, therefore, one object of the invention to provide a mechanism for automatically accomplishing such variation.

Other objects will appear from time to time in the specification and claims.

The invention is illustrated more or less diagrammatically in the accompanying drawings, wherein:—

Figure 1 is a perspective, diagrammatic view illustrating one form of the invention;

Figure 2 is a perspective, diagrammatic view illustrating a form somewhat similar to that of Figure 1;

Figure 3 is a disassembled view in perspective, of the electric servomotor embodied in the device of Figure 2;

Figure 4 is a perspective, diagrammatic view illustrating a further modified form in which a ratchet mechanism is embodied;

Figure 5 is a perspective, diagrammatic view illustrating a still further modified form somewhat similar to that of Figure 4, in which the ratchet mechanism is retained and in which an electric rheostat is also used.

Like parts are designated by like characters throughout the specification and drawings.

In the several figures the invention is shown as applied to a lathe. It might, of course, be applied to any similar or analogous machine or movement in connection with which it is desirable to maintain a constant speed relation between a rotating part and a member which is moved radially with respect to said part.

I indicates a support and guide for an intermediate tool carrier or slide 2. 3 is the tool carrier proper, mounted for transverse movement with respect to the intermediate carrier 2 and it carries any suitable tool 4. The details of the lathe and the tool carrying assembly form no essential part of the present invention and it is sufficient for the purposes of this invention that some tool carrier be arranged which is movable and whose movement is controlled by the mechanism described below in accordance with the purposes of the invention.

5 is a threaded screw or spindle which engages a correspondingly threaded portion 6 of the intermediate tool carrier 2 in such manner that upon rotation of the screw 5 the tool carrier is moved, its direction of movement depending upon the direction of rotation of the screw 5. By means of a driving connection comprising bevel or other suitable gears 7 the cross feed screw 5 is connected in the form shown in Figures 1 and 2, to a shaft 8 which carries a worm 9 and is driven by any suitable means as will be described in detail below. In the forms shown in Figures 4 and 5 the cross feed screw 5 is connected by the gearing 7 to a crank shaft 10. In all of the forms of the invention shown, the movement of the shafts 8 and 10 is controlled by the movement and position of a cam slot 11. In the form of the device shown in Figure 1 that slot is formed directly in a worm gear 12 which meshes with the worm 9 and is carried on a shaft 12a. In the form of the device shown in Figure 2, the slot is formed in a rotary member 13 which is attached to a shaft 14 of a servomotor X whose construction will be described in detail below. The second shaft 15 of the servomotor X carries at its exposed end a worm gear 16 which meshes with the worm 9.

In the form of the device shown in Figure 4, the cam slot 11 is formed directly in a worm gear 17 which meshes with the worm 18 on the crank shaft 10, the gear 17 being carried on a shaft 17a. In the form of the device shown in Figure 5 the cam slot 11 is formed in a worm gear 19 positioned on a shaft 20 and engaging a worm 21 on a shaft 22 which carries a gear 23 meshing with a gear 24 on the crank shaft 10.

From the above it will be seen that in each case the cam slot or cam member 11 is so connected by a variety of linkages with the shaft which controls the drive of the cross feed screw 5 that this drive is controlled by the movement and position of the cam slot 11.

In the particular forms of the invention shown, since they are shown as embodied in a lathe, a chuck 25 is shown and this may carry a pulley 26 which is driven by a belt 27 from any suitable power source. In the form shown in Figure 1 the power source is a motor 28 which drives a variable speed transmission of any desirable type 29. A pulley 30 extends from this transmission. The belt 27 is positioned about the pulley so that the chuck and the work are driven from the pulley through the belt. In the form of the device shown in Figures 2 and 4 no motor is shown. The belt 27 may be driven from any desired power source. In the form of the invention shown in Figure 5 a separate motor 31 is shown.

A piece of work 32 is secured to the chuck in any desired manner. It is to be understood that the piece of work is merely illustrative and that a piece of any desired shape may be used. One of generally annular shape is shown in the present drawings but is so shown merely for illustration. It is shown as being engaged by the cutting tool 4 and the cutting operation is proceeding and a chip 33 appears as being cut from the work piece by the cutting tool.

Considering now in detail the form of the device shown in Figures 1 and 2, the motor drives through the variable speed transmission 29 which as above noted may be of any desired type and design. Two control levers 34, 34 extend out from the transmission housing. These levers may be used to control variations in output speed of the transmission. Certain types of transmission will require one lever and others will require two. Therefore, although two are shown it is to be understood that the invention is not limited to the use of two and one might be used or more than two might be used.

From each control lever extends a link 35. At the outer end of each link is a cam contacting member which as here shown is preferably in the form of a roller 36 carried by a pin 37 and each roller is received in a cam slot 38 in a movably or slidably mounted cam plate 39. It is to be understood, of course, that if only a single lever 34 is used, there will be but a single link 35, a single roller 36 and a single cam slot 38. The cam plate is generally mounted for sliding movement and as here shown is provided with a dovetail member 40 which fits into a correspondingly shaped guide 41. Thus the cam plate is mounted for controlled sliding movement.

In the form shown in Figure 1 the cam plate 39 carries a rack 42 which engages a pinion 43 on a shaft 44, the pinion being fixed on the shaft. A loosely mounted pinion 45 is also carried on the shaft and is provided with a clutch portion or end 46. Keyed or splined on the shaft is a clutch member 47, provided on its opposite faces with clutches 48 and 49. A hand wheel 50 is also rotatably mounted on the shaft 44 and is provided with a clutch portion or face 51.

To control the clutch or coupling member 47 a handle member 52 is provided. It is pivoted on a support 53, has a handle 54 and a yoke 55 which engages the clutch 47. The clutch or coupling 47 may itself be moved so as to engage the loose pinion 45 and thus secure the pinion to the shaft 44 for rotation with it, or it may be moved in the opposite direction to engage the hand wheel 51 and thus to secure it to the shaft 44 for rotation with it. When the hand wheel is itself engaged, the device is in condition for manual setting or adjustment and when the pinion 45 is engaged, the device is in condition for automatic adjustment. The pinion 45 engages a movable rack 56 which is mounted to slide in a support 57. At its outer end the rack is provided with an extension 58 which carries a cam contacting member, preferably a roller 59, which is carried on a pin 60. The roller lies within the cam groove 11.

In the form of the device illustrated in Figure 2, the cam plate 39, instead of carrying a rack, carries an extension 61, which is perforated and threaded to receive the threaded portion 62 of a shaft 63. The shaft is splined as at 64 and carries slidably mounted on the splines a pinion 65 which engages a pinion 66 carried on a stub shaft 67 mounted in suitable bearings. By means of bevel or other gears or connections 68 the shaft 67 is connected to a hand adjusting shaft 69 which carries a hand adjusting wheel 70. A support for the shaft 69 is indicated at 71.

At its outer or free end the shaft 63 is provided with a member 72 which carries a pin 73 upon which is mounted a roller 74. This roller lies within and engages the cam slot 11 in the member 13.

Interposed between the shaft 14 and the worm gear 16 which meshes with the worm 9 on the shaft 8 is a servomotor generally indicated in Figure 2 as X. The parts of the servomotor are shown in Figure 3 disassembled. Fixed to the casing of the servomotor X is a disc 75. A radial lug piston 76 is carried on the inner face of the disc 75. Fixed on the shaft 14 is a second disc 77 carrying a radial lug piston 78. The disc 77 is perforated by a hole 79 on one side of the lug 78 and by a second hole 80 on the opposite side of the lug 78.

Fixed on the shaft 15 which carries at its outer end the worm gear 16 is a disc 81. It is provided with a perforation 82, a second perforation 83, which on the upper face of the disc 80 joins and communicates with an angularly shaped escape slot 84. 85 is a third hole or perforation through the disc 81 which on the upper side of that disc joins and communicates with a generally straight slot or groove 86.

Fixed to the housing of the servomotor X is a plate 87 which has an annular outlet groove 88 and an annular inlet groove 89. A connection or conduit 90 furnishes a connection from the outlet groove 88 and a connection or conduit 91 furnishes a connection to the inlet groove 89.

In the form of the device shown in Figure 4, a variable speed friction transmission is shown as a means for driving the apparatus. As there shown this transmission is driven by a belt 92 which is driven from any suitable power source. It drives a pulley 93 and a shaft 94. The shaft is splined as at 95 and is normally driven at constant speed. A small friction wheel 96 is mounted in suitable bearings 97 which form part of the frame from which an arm 98 extends. The wheel 96 is splined on the shaft 95 and is so driven with it, irrespective of its longitudinal position with respect to the shaft. The friction wheel 96 contacts the upper surface of the second friction wheel 99 and thus drives it, and through it drives the shaft 100, which is connected by any suitable gearing to drive the belt 27 and thus to drive the chuck 25. It is to be understood that any suitable drive may be provided between the shaft 100 and the chuck and the invention is not limited to any particular form or mechanism for transmitting power from the driven shaft 100 to the chuck.

At its outer end the arm 98 carries a pin 101 upon which is mounted a contact roller 102. This roller lies within the cam groove 103 which is formed in a gear 104 which is itself mounted on a shaft 104a. Meshing with this gear is a pinion 105 carried on a shaft 106 which carries at its opposite end a ratchet 107. On its outer end the shaft 106 carries an adjusting hand wheel 108. A pawl 109 is carried at the outer end of a swinging arm 110. A pawl connecting rod 111 connects the arm 110 with the crank of the crank shaft 10. 112 is an adjustable shield carried at the outer end of an arm 113 which is arranged to move concentrically with the ratchet 107 and can be moved to cover or shield the teeth of the ratchet 107 to limit the number of teeth which can be engaged and consequently to limit the amount of travel of the ratchet at each reciprocation of the pawl. Joined to the arm 113 so as to form in effect an extension of it is an arm 114 which carries a pin 115 upon which is rotatably mounted a roller 116 which lies within and engages the cam groove or slot 11. Thus the position of the roller within the cam groove controls the position of the shield 112 and so controls the movement of the ratchet 107 for each reciprocation.

The device of Figure 5 is somewhat similar to that of Figure 4 and differs from it in the main by the mechanism which controls the ratchet operation. 117 is a connecting rod mounted on the crank of the crank shaft 10 and carrying at its upper or free end a rack 118. Suitable guides will be provided for the rack to insure its movement along the proper path. They are omitted in the present drawings for the sake of clearness. The rack meshes with a pinion 119, which carries fixed to it a pawl arm 120 which carries at its outer end a pawl 121. The pawl may engage a ratchet 122. The ratchet is mounted on a shaft 123 which carries at one end an adjusting hand wheel 124 and at the opposite end a contact arm 125 of a rheostat 126. As shown the rheostat is connected by suitable wiring 127 with the motor 31 and the rheostat is moved or adjusted to vary the speed of that motor. A plurality of contacts 128 are provided on the rheostat and the contact arm 125 in its movement contacts one or another of the contact points 128 and thus suitably varies the speed of the motor. 129 is an adjustable shield which may be positioned to cover a number of the ratchet teeth and thus to limit the movement of the ratchet wheel in response to reciprocation of the pawl 121. This cover is carried on two arms 130, one or both of which may be arcuate at its lower end and notched or shaped to provide teeth 131. These teeth engage a rack 132 formed on the connecting member 133 which carries at its opposite end a pin 134 upon which is rotatably mounted a roller 135 which is positioned within and engages the cam slot or groove 11 in the worm gear 19.

In general with respect to the cam paths or cam contours of the various cams shown, these will be designed to suit not only the R. P. M. of the work in relation to the cutting radius of the cutting tool, but also they must be properly related to the speed ratio of the variable transmission and the selection of the particular type of variable transmission will to some degree govern the cam path selected. However, the cam paths and the relationship between the several parts which determine them can be established by formulae as follows:

No. 1. $$\frac{R-N}{S}=M$$

in which—
R equals maximum radius of cutting tool on work.
S equals any radius of cut for which the revolutions per minute is required.
N equals the minimum revolutions per minute available.
M equals resulting revolutions per minute for S.

There is also the relation based upon the cutting radii as follows:

No. 2. $$\frac{R}{T}=P$$

in which—
T equals minimum radius of cutting tool on the work.
P equals total ratio of variable speed transmission from minimum to maximum speed.

There is also the relation based upon cutting speed in feet per minute, which also bears the same ratio in corresponding revolutions per minute, which can be expressed as follows:

No. 3. $$\frac{Q}{N}=P$$

in which—
Q equals maximum revolutions per minute available.

Any cam path used as a control to vary the speed of the variable speed transmission will agree with the above relations, irrespective of the type of variable speed transmission selected.

The use and operation of my invention are as follows:

In the form of Figure 1 the cutting tool 4, either by hand or mechanically, is brought to position for beginning the cutting, shaping or finishing operation of the work piece 32. This may be done with the typical means provided on any standard lathe and during this initial setting the coupling or clutch 47 is disengaged from the hand wheel 50 and the pinion 45 and thus during this initial setting of the tool the speed control cam plate 39 remains stationary. After the tool is set at the initial point, the coupling or clutch 47 is moved to engage the hand wheel 50 and by rotating that hand wheel the cam plate 39 is so moved as to move the variable speed control levers 34 to the desired position for the selected initial cutting speed so that the chuck is initially driven at the desired speed. Any desirable power source may be used to drive the chuck through the variable speed transmission. This power source is preferably of constant speed.

By means of the operations thus far mentioned the tool is set at the desired beginning point and the cam plate 39 is also set as desired. Now the coupling or clutch 47 is moved to engage the gear 46 and any crosswise movement of the cutting tool automatically moves the cam plate 39 according to a predetermined speed and amount which is determined by the shape of the cam slot or groove 11 in the gear 12 and through the linkage shown and above described. The cam path defined by the groove or slot 11 is so designed as to vary the position of the speed control cam plate 39 so that the working speed at the cutting point of the tool 4 is maintained at the initial determined feet per minute cutting speed, even though the tool 4 is constantly changing its cutting radius. Thus if the tool 4 is moving in toward the center of the work piece 32 the cutting radius is being reduced and the speed of the chuck 25 is being increased to compensate for this reduction in radius. To return the mechanism to begin another cycle when that becomes necessary, the lathe is reversed by means of the gearing normally used in lathes to return the tool and tool carrier and all other gears and cams will automatically follow in the reverse movement.

It will be understood that in all movements of the cam plate 39 the contact rollers 36 within the cam slots or grooves 38 are moved and through the members 35 move the speed control levers 34 to effect the desired speed control of the variable speed transmission 29.

During the cutting operation the gear 12 is rotated. This rotation is accomplished by the rotation of the worm 9 which meshes with the gear 12. The worm 9 being fixed on the drive shaft 8 is rotated when it is driven. This drive shaft is driven from any suitable power source, preferably at constant speed. It may be driven from the motor 28 or otherwise. The cam groove 11 is so shaped and proportioned with respect to the limits of travel of the tool carrier, that when the tool is at its extreme outside end of travel the contact roller 59 is in one end of the cam groove and when the tool carrier is at its extreme inner end of travel the contact roller 59 is in the opposite end of the groove. Thus the cam groove 11 makes one complete revolution or travel while the tool carrier makes one complete cross travel with respect to the work piece.

The device can be operated, of course, to drive in either direction and if the cutting tool begins its cutting at the center and moves outward the speed of rotation of the driving mechanism is reduced as the radius of the cutting increases. Thus whichever way the tool moves, the cam plate 39 is correspondingly moved, its movement being determined by the position and movement of the cam groove 11, and a constant cutting speed is maintained throughout.

An automatic disengagement mechanism may be provided so that at the end of the movement of the cutting tool in either direction the clutch or coupling 47 is disengaged. A stop or stops can be arranged to be contacted by the speed control cam 39 at the limit of its movement in each direction to effect the throw-out of the clutch 47.

The operation of the form of the device shown in Figure 2 is substantially the same as that shown in Figure 1 except that a servomotor is inserted in the assembly between the tool carrier 3 and the variable speed control cam plate 39. In the particular form shown, the servomotor is hydraulically operated. The power to rotate the member 13 and the cam 11 is furnished by the servomotor which may be driven by any high pressure liquid entering the motor through the conduit 91 and leaving through the conduit 90. The angular rotation is controlled by a rotating valve disc 81 upon a shaft 15 on the outer end of which the worm gear 16 is mounted. Movement of the worm gear 16 through the worm 9, shaft 8, gearing 7 and cross feed screw 5 effects movement of the tool carrier 3 and tool 4. Any angular rotation of the disc 81 and the worm wheel will cause an exact equivalent angular rotation of the shaft 14, the member 13 and the cam groove 11. Movement of this cam groove is effective, through the roller 74, the shaft 63 and the threaded portion of that shaft which is engaged in the interiorly threaded extension 61 of the speed control cam plate 39, to cause a corresponding variation in the speed of the drive in the same manner as movement of the plate 39 described in connection with Figure 1 causes a variation in the speed effective through the variable speed unit 29 which is shown in Figure 1 but omitted from Figure 2. The tool carrier drive assembly above described is driven in the same manner as that described in connection with Figure 1, namely, the drive shaft 8 is driven from any suitable power source, such as the motor which drives the chuck or any other source desired.

The parts of the servomotor are shown disassembled in Figure 3. Worm gear 16 has been omitted from the outer end of shaft 15 and the cam carrier 13 has been omitted from the outer end of the shaft 14 in Figure 3, to avoid confusion. The disc 81 of the servomotor, since it is carried by the shaft 15 which carries the work gear 16, rotates with the rotation of the cross feed screw 5. The inlet hole 82 of the disc 81, in its rotation, matches the hole 79 in disc 77 and oil under pressure is permitted to pass into the space between the fixed radial stop 76 and the lug piston 78 on the disc 77. The disc 77 is thus rotated, due to oil pressure on the side of the lug piston 23. The oil pressure is relieved on the opposite side by the outlet 80, matching with the hole 83 in disc 81 which discharged into the annular inlet conduit 88. The rotation of plate 81 successively uncovers the hole 79 and the outlet 80, thus causing the disc 77 and its attached cam carrier 13 to follow the exact annular rotation of the driven disc 81. To return the disc 77 to its starting point, the disc 81 is reversed and the slot or groove 86 becomes the inlet to the hole 80 and the slot 84 becomes the outlet from the hole 79 and the disc 77 thus follows the disc 81 in reverse movement in the same manner and for the same reason above described.

In general the operation of the form of the device shown in Figure 2 requires first a setting of the tool carrier 3 to the position where it is desired to begin the cut or finish on the work piece 32. This is accomplished in the manner described in connection with Figure 1. The movement of the tool and tool carrier to the initial position must be carried out with the servomotor power applied so that the relative movement of the tool carrier and the cam 11 is maintained throughout, even during this adjustment period. The tool carrier itself is moved with the typical or usual means provided with any standard lathe. With the tool set in the desired initial position, the hand wheel 70 is rotated and through the gearing shown rotates the gear 65 which is slidable on the splines of the shaft 63. The shaft 63 is thus rotated and through its threaded engagement with the extension 61 of the cam plate 39 the latter is moved to move the variable speed control levers to the necessary position to effect the desired setting for the initial cutting speed which is to be given to the chuck. This rotation of the shaft 63 is possible because the mounting of the member 72 on the end of the shaft is such as to permit relative rotation of the parts.

With the initial setting of the tool and of the cam disc 39 above described, any constant speed power source, such as the motor shown in Figure 1, driving through the variable speed transmission device, is ready to deliver the proper initial rotating speed to the chuck 25 carrying the work piece 32. Any rotation of the worm gear 16 is identical with the resulting rotation of the cam carrier 13 which is driven through the servomotor X. Thus crosswise movement of the cutting tool and head automatically moves the cam plate 39 at a speed and in an amount predetermined by the shape and location of the cam slot or groove 11 and the path of this cam is so designed as to vary the position of the cam plate 39 to maintain constant the cutting speed for which that plate was originally set. This speed is, of course, maintained constant even though the tool 4 and the tool carrier 3 are constantly changing their position, that is to say, their cutting radius, and thus if the tool 4 is moving toward the center of the work piece 32 the cutting radius is reduced and the R. P. M. of the chuck 25 increases to compensate for this radial reduction. Should the parts be moving in the opposite direction, the relationship is maintained similarly so that the cutting speed remains constant during movement of the tool irrespective of the direction of that movement.

To return the mechanism to its original position to begin another cycle, the lathe is reversed by the gearing usually provided to move the tool carrier and all parts, including the servomotor, will follow and will return to their original, initial position and this will be repeated with successive cycles until a new initial setting of the tool or of the cam plate 39 is desired and accomplished.

As in the case of the form shown in Figure 1, an automatic disengaging means may be provided. It might comprise an end stop for the control cam plate 39 to operate a stop valve or by-pass valve to cut off hydraulic power from the servomotor.

The operation of the forms of the device shown in Figures 4 and 5 are in one respect at least similar because each of these forms embodied a ratchet and pawl mechanism. Thus the variation in the speed of the chuck drive in response to movements of the tool and the tool carrier is, in these forms, not truly stepless as in the case of the earlier forms because the speed accomplished by the mechanisms of Figures 4 and 5 is in a sense a step by step change. The steps are such that for many purposes the speed change might almost be considered as being stepless but as a matter of accurate description it cannot be so described and must be considered as being accomplished by a series of steps.

In the form of the device shown in Figure 4, instead of the speed control cam plate 39 shown in Figures 1 and 2, a rotary cam groove 103 is embodied in a carrying member 104. A shaft 94 is rotated from any suitable power source and so rotates the friction wheel 96 which engages a friction wheel 99, rotating it. The speed of rotation of the wheel 99 is dependent upon the distance of the smaller wheel 96 from the center of rotation of the wheel 99 and this small wheel is moved in or out with respect to the center of the wheel 99 by the movement of the cam disc or groove 103.

As in the case of the preceding forms of the device, the tool and tool carrier are moved by a shaft which is driven from any suitable power source. In the present form this shaft is the crank shaft 10. In its rotation by means of the worm 18 it moves the worm gear 17 carrying the control cam slot or groove 11. A roller 116 lies within and engages this groove and traverses normally from end to end of the groove during one entire work stroke. The position of the roller 116 controls the position of the ratchet shield 112 and thus this shield is moved to vary the number of ratchet teeth which it covers and which it thus holds out of contact with the pawl 109 which is reciprocated by movement of the crank through the connecting rod 111. Thus the amount of forward movement of the ratchet is controlled by the position of the shield 112 and this in turn is controlled and is moved by the position and movement of the cam slot or groove 11.

When the device as shown in Figure 4 is to be used the cutting tool is brought manually or otherwise to the desired position for commencing the cut. This ordinarily is accomplished by a mechanism which forms a part of any standard lathe or similar tool. When the tool has been initially set at the desired point the hand wheel 108 is rotated in a clockwise direction, that is to say, in a direction opposite that in which the ratchet wheel will be driven in normal operation. This is necessary so that the pawl 109 will not prevent rotation of the ratchet. Rotation of the hand wheel 108 rotates the shaft 106 and through the pinion 105 which engages the gear 104, moves the speed control cam slot or groove 103 to a position which carries the friction driving wheel 96 to a radius on the large driven friction wheel necessary to effect the selected initial cutting speed of the cutting tool 4. Any constant speed power source may be used to drive the shaft 94 and thus to drive the friction wheels 96, 99 and the shaft 100, which latter is arranged through any suitable gearing to drive the chuck 25.

Crosswise movement of the tool and tool carrier occurs always with a corresponding rotation of the worm 18 on the shaft 10 and this through the movement of the crank reciprocates the connecting rod 111 and the pawl arm 110 and the pawl 109. Through this movement the ratchet 107 is rotated in a step by step movement and the degree of angular movement for each reciprocation is governed by the position of the movable pawl shield 112. The greater the number of teeth covered by the pawl shield the less the angular movement of the ratchet and correspondingly the less the rotation of cam slot 103, which controls the variable speed.

The mechanism shown and just described thus accomplishes a variable speed control of the chuck in which cam 11 governs the movement and position of the friction driving pinion or wheel 96 and the relative control by means of which a constant cutting speed is accomplished irrespective of the position and movement of the tool is the same as that accomplished by the form of the device shown in Figures 1 and 2, except that as above noted, the movement in the earlier forms is stepless while the movement in the form of Figure 4 is accomplished by steps.

If it is desired to use the device of this figure both for cutting on a reducing or an increasing radius, a reverse gear must be placed between the cutting tool and the worm drive, that is to say, between the cutting tool and the worm 18 and the worm gear 17.

An automatic end stop mechanism may be accomplished by providing means to lift and to hold out of operative movement the pawl 109, this lifting to occur when the cam carrier gear 17 shall have moved to one or the other limits of its movement.

The operation of the form of the device shown in Figure 5 is as above noted generally similar to that shown in Figure 4, the main difference being that a rheostat is arranged instead of the second cam to govern the speed of the motor directly and thus to govern the speed of rotation of the chuck. Thus the rheostat is substituted for the cam 103 in the cam carrying gear 104. The introduction of the racks 118 and 132 provides means whereby the amplitude of the pawl reciprocation may be increased and whereby a more sensitive operation is possible and thus the step from one speed change to the next is reduced and this device in practice acts more nearly like a stepless change device than does the form of Figure 4.

The device of Figure 5 requires a reverse gear to permit operation in both directions in the same manner and for the same reasons as does the device of Figure 4.

An automatic disengagement effective for example to hold the pawl 121 out of operative movement may also be inserted in the device of Figure 5 in the same manner as suggested for the device of Figure 4.

I claim:

1. In combination with a lathe or analogous machine, having a work holder and driving means therefor, a tool holder relatively movable with respect to the work holder, and driving means therefor; automatic means effective upon movement of the tool holder to vary the speed of the work holder drive to maintain a constant cutting speed at the tool, said means comprising a member driven in response to movement of the tool holder drive, and a crank linkage driven by said member movement to vary the speed of the work holder.

2. In combination with a lathe or analogous machine, having a work holder and driving means therefor, a tool holder relatively movable with respect to the work holder and driving means therefor; automatic means effective upon movement of the tool holder to vary the speed of the work holder drive to maintain a constant cutting speed at the tool, said means comprising a cam member driven in response to movement of the tool holder drive, and a linkage driven by said cam member movement and connected to said work holder drive to vary the speed of the work holder and cam means controlling said electric drive.

3. In combination with a lathe or analogous machine, having a work holder and rotating means therefor, a tool holder radially movable with respect to the work holder and driving means therefor; automatic means effective upon movement of the tool holder to vary the speed of the work holder drive and comprising a plurality of cams to maintain a constant cutting speed at the tool.

4. In combination with a lathe or analogous machine, having a work holder and rotating means therefor, a tool holder radially movable with respect to the work holder, and driving means therefor; automatic means effective upon movement of the tool holder to vary the speed of the work holder drive to maintain a constant cutting speed at the tool, said means comprising a member driven in response to movement of the tool holder drive, and a crank linkage including a link and a lever driven by said member movement and connected to said work holder drive, to vary the speed of the work holder.

5. In combination with a lathe or analogous machine, having a work holder and rotating means therefor, a tool holder radially movable with respect to the work holder and driving means therefor; automatic means effective upon movement of the tool holder to vary the speed of the work holder drive to maintain a constant cutting speed at the tool, said means comprising a cam member driven in response to movement of the tool holder drive, and a linkage including a second cam driven by said cam member movement and connected to said work holder drive to vary the speed of the work holder.

6. In combination with a lathe or analogous machine, having a work holding chuck, and a tool holder, together with means for moving the chuck and for moving the tool holder with respect to the chuck and with respect to a work piece on the chuck, means for maintaining a constant cutting speed, said means comprising a cam member driven from the tool holder drive, and a speed control assembly, comprising linkage between said chuck moving means and said member driven by said tool holder drive, said linkage including a second cam, whereby movement of the latter effects a corresponding movement in the speed control assembly and varies the speed of the chuck drive in response to movement of the tool and maintains a constant cutting speed.

7. In combination with a lathe or analogous machine, having a work holder and driving means therefor, a tool holder relatively movable with respect to the work holder, and driving means therefor; automatic means effective upon movement of the tool holder to vary the speed of the work holder drive to maintain a constant cutting speed at the tool, said means comprising a cam member driven in response to movement of the tool holder drive, and a second cam member movably mounted, said second cam member so connected to the driving means that its movement varies the effective speed output of said driving means, and a connection between said first cam means and said second cam means whereby the latter is moved in correspondence to the former.

8. In combination with a lathe or analogous machine, having a work holder and driving means therefor, a tool holder relatively movable with respect to the work holder, and driving means therefor; automatic means effective upon movement of the tool holder to vary the speed of the work holder drive to maintain a constant cutting speed at the tool, said means comprising a cam member driven in response to movement of the tool holder drive, and a second cam member movably mounted, said second cam member so connected to the driving means that its movement varies the effective speed output of said driving means, and a connection between said first cam means and said second cam means whereby the latter is moved in correspondence to the former, and a servomotor effective to drive said first mentioned cam means in response to movement of the work holder drive.

9. In combination with a lathe or analogous machine, having a work holder and driving means therefor, a tool holder relatively movable with respect to the work holder and driving means therefor; automatic means effective upon movement of the tool holder to vary the speed of the work holder drive to maintain a constant cutting speed at the tool, said means comprising a cam member driven in response to movement of the tool holder drive, and a linkage driven by said cam member movement and connected to said work holder drive to vary the speed of the work holder, and manual means for initially setting said automatic speed control at a predetermined initial work driving speed.

10. In combination with a lathe or analogous machine, having a work holder and driving means therefor, a tool holder relatively movable with respect to the work holder, and driving means therefor; automatic means effective upon movement of the tool holder to vary the speed of the work holder drive to maintain a constant cutting speed at the tool, said means comprising a cam member driven in response to movement of the tool holder drive, and a second cam member movably mounted, said second cam member so connected to the driving means that its movement varies the effective speed output of said driving means, and a connection between said first cam means and said second cam means whereby the latter is moved in correspondence to the former, and manual means for initially setting said automatic speed control at a predetermined initial work driving speed.

11. In combination with a lathe or analogous machine, having a work holder and driving means therefor, a tool holder relatively movable with respect to the work holder, and driving means therefor; automatic means effective upon movement of the tool holder to vary the speed of the work holder drive to maintain a constant cutting speed at the tool, said means comprising a cam member driven in response to movement of the tool holder drive, and a second cam member movably mounted, said second cam member so connected to the driving means that its movement varies the effective speed output of said driving means, and a connection between said first cam means and said second cam means whereby the latter is moved in correspondence to the former, and a servomotor effective to drive said first mentioned cam means in response to movement of the work holder drive, and manual means for initially setting said automatic speed control at a predetermined initial work driving speed.

12. In combination with a lathe or analogous machine, having a work holder and driving means therefor, a tool holder relatively movable with respect to the work holder and driving means therefor; automatic means effective upon movement of the tool holder to vary the speed of the work holder drive to maintain a constant cutting speed at the tool, said means comprising a member driven in response to the movement of the tool holder drive, and a linkage driven by said member movement to vary the speed of the work holder, the means for driving said member from said tool holder drive comprising a pawl and ratchet mechanism.

13. In combination with a lathe or analogous machine, having a work holder and driving means therefor, a tool holder relatively movable with respect to the work holder, and driving means therefor; automatic means effective upon movement of the tool holder to vary the speed of the work holder drive to maintain a constant cutting speed at the tool, said means comprising a cam member driven in response to movement of the tool holder drive, and a linkage driven by said cam member movement and connected to said work holder drive to vary the speed of the work holder, the means for driving said cam member from said tool holder drive comprising a pawl and ratchet mechanism.

14. In combination with a lathe or analogous machine, having a work holder and driving means therefor, a tool holder relatively movable with respect to the work holder and driving means therefor; automatic means effective upon movement of the tool holder to vary the speed of the work holder drive to maintain a constant cutting speed at the tool, said means comprising a member driven in response to the movement of the tool holder drive, and a linkage driven by said member movement to vary the speed of the work holder, the means for driving said member from said tool holder drive comprising a pawl and ratchet mechanism, and means automatically responsive to movement of said tool holder drive for limiting the effective stroke of said pawl in accordance with movement of said tool holder.

15. In combination with a lathe or analogous machine, having a work holder and driving means therefor, a tool holder relatively movable with respect to the work holder, and driving means therefor; automatic means effective upon movement of the tool holder to vary the speed of the work holder drive to maintain a constant cutting speed at the tool, said means comprising a cam member driven in response to movement of the tool holder drive, and a linkage driven by said cam member movement and connected to said work holder drive to vary the speed of the work holder, the means for driving said cam member from said tool holder drive comprising a pawl and ratchet mechanism, and means automatically responsive to movement of said tool holder drive for limiting the effective stroke of said pawl in accordance with movement of said tool holder.

16. In combination with a lathe or analogous machine, having a work holder and electric driving means therefor, a tool holder relatively movable with respect to the work holder and driving means therefor; automatic means effective upon movement of the tool holder to vary the speed of the work holder drive to maintain a constant cutting speed at the tool, said means comprising a member driven in response to movement of said tool holder, and a linkage driven by said member movement to vary the speed of the work holder, said linkage including a ratchet and a rheostat effective upon said electric work holder driving means.

ROBERT CRZELLITZER.